(12) United States Patent
Pierce

(10) Patent No.: US 9,852,474 B2
(45) Date of Patent: Dec. 26, 2017

(54) COMPUTERIZED COMPOSITE RISK AND BENEFITS APPARATUS AND METHOD

(71) Applicant: Benefits Technologies, LLC, Sapulpa, OK (US)

(72) Inventor: Dwight L. Pierce, Tulsa, OK (US)

(73) Assignee: Benefits Technologies, LLC, Sapulpa, OK (US)

( * ) Notice: Subject to any disclaimer, the term of this patent is extended or adjusted under 35 U.S.C. 154(b) by 0 days.

(21) Appl. No.: 14/276,897

(22) Filed: May 13, 2014

(65) Prior Publication Data

US 2014/0249863 A1     Sep. 4, 2014

Related U.S. Application Data

(63) Continuation-in-part of application No. 11/649,088, filed on Jan. 3, 2007, now abandoned.

(51) Int. Cl.
    *G06Q 40/08*     (2012.01)
(52) U.S. Cl.
    CPC .................. *G06Q 40/08* (2013.01)
(58) Field of Classification Search
    CPC ...................................... G06Q 40/08
    USPC ........................................ 705/14, 4
    See application file for complete search history.

(56) References Cited

U.S. PATENT DOCUMENTS

| | | | |
|---|---|---|---|
| 5,191,522 A * | 3/1993 | Bosco et al. ................ 705/4 |
| 7,853,460 B2 * | 12/2010 | Ruark .............. 705/4 |
| 8,655,776 B2 * | 2/2014 | Cheung ................ G06Q 30/00 705/35 |
| 8,781,929 B2 * | 7/2014 | Stiff ................ G06Q 40/02 705/35 |
| 2002/0111946 A1 * | 8/2002 | Fallon ............ G06Q 10/10 |
| 2004/0006489 A1 * | 1/2004 | Bynon ............. 705/2 |
| 2004/0138927 A1 * | 7/2004 | Eydeland .......... G06Q 40/02 705/4 |
| 2009/0099979 A1 * | 4/2009 | Raghavan et al. .......... 705/36 R |

* cited by examiner

*Primary Examiner* — Bruce I Ebersman

(57) ABSTRACT

A computerized composite risk and benefit product provides a plan participant with a "bank" of coverage through a self-funded trust, which the bank amount set based on the actuarially determined contribution amount paid by the participant. All claims paid are charged against the bank, such that when the bank is exhausted the plan is terminated. The product provides a comprehensive coverage package but a relatively low contribution due to the low underwriting risk resulting from the maximum possible claim amount being capped. Therefore, a comprehensive plan may be provided to a participant at a lower contribution.

12 Claims, 2 Drawing Sheets

COMPUTERIZED COMPOSITE RISK AND BENEFITS APPARATUS AND METHOD

CROSS-REFERENCE TO RELATED APPLICATIONS

This application claims the benefit of U.S. patent application Ser. No. 11/649,088, filed on Jan. 3, 2007, and entitled "Composite Risk Financial Security Method." Such application is incorporated herein by reference in its entirety.

STATEMENT REGARDING FEDERALLY SPONSORED RESEARCH OR DEVELOPMENT

Not applicable.

BACKGROUND OF THE INVENTION

The present invention relates to a computerized apparatus and method that provides a composite risk program combining different types of benefits.

Various types of insurance are known in the art. Life insurance, which pays a benefit to a named beneficiary upon the death of the insured, may include both whole life and term life insurance. The most common type of health insurance is a comprehensive policy that includes coverage for numerous health-related expenses, including primary-care physician office visits, prescription drugs, and hospitalization. In addition to these types of comprehensive policies, however, there are a number of more specialized health insurance products offered in the market today. These are intended to provide supplemental or additional coverage where a comprehensive insurance policy may exclude coverage, such as providing cash benefits when a large annual deductible may be incurred in a comprehensive policy. The various types of specialized health insurance products include, but are not necessarily limited to, accident, supplemental disability, critical illness, and supplemental hospital indemnity.

Accident insurance generally provides lump-sum payments to an insured according to a schedule of benefits when triggered by certain injuries or conditions defined in the policy. The purpose of such payments is to defer costs generally associated with these injuries, such as ambulance fees, emergency room and hospital charges, physician and other medical professional fees, and medical equipment. Disability insurance generally is used to replace all or, more frequently, a set fraction of an insured's regular income upon the occurrence of a disability that prevents the insured from continuing with his or her employment. These policies often distinguish between benefits for partial disability, which may limit the work performed by the insured, and total disability, in which the insured is no longer able to continue working. Critical illness policies (sometimes also referred to as "dread disease" policies) generally provide an insured with a lump-sum payment or schedule of benefits upon diagnosis of certain major illnesses or health conditions, such as cancer, myocardial infarction (heart attack), stroke, and renal failure. The lump-sum payment may vary depending upon the particular illnesses diagnosed. Additional benefits may be included in some insurance products of this type, such as daily benefits for hospital stays or additional payments for particular types of treatment options chosen. Finally, hospital indemnity insurance generally provides a lump-sum payment to the insured upon admission to a hospital, coupled with a per diem benefit for the length of the insured's hospital stay.

Both life insurance and the various types of supplemental insurance products described above are often offered to potential customers through a group insurance setting, that is, as part of an over-arching policy that is provided to the potential insureds through their employer. Group insurance is often advantageous because risk is spread across a larger pool of insureds, and premium costs may thus be lower than individual insurance policies of comparable coverage in many cases. In addition, employers often pay some or all of the insurance premiums associated with an employee and/or the employee's spouse and dependents as part of an employee's compensation package. Even where the employer is able to defer little of the cost of these specific health insurance products, the employer may wish to provide the opportunity to receive specific health insurance coverages through a group insurance policy to employees who may not be able to afford a comprehensive health insurance policy.

A significant disadvantage associated with the various supplemental and specific health insurance policy products on the market today is that, since a separate cost is associated with each of the specific types of coverage made available, the potential insured with limited financial resources is faced with the difficult task of determining which of the policies should be purchased. In essence, the insured is being asked to guess which risk is most likely to occur for him or her. Guessing wrong in this circumstance may mean that the insured faces a catastrophic health event without any coverage at all, despite having paid premiums for an insurance policy during the period in which the event occurs. For example, suppose that the insured chooses specific insurance policies through an employer group program for cancer/critical illness coverage and for accident coverage. The insured then suffers a long-term, debilitating illness that is not covered in the cancer/critical illness policy. The insured, despite having paid premiums for health insurance, will receive no benefit whatsoever and, if rendered disabled by the illness, may be unable to provide support for himself or herself as well as his or her family simply because he or she guessed wrong in not choosing disability insurance.

A related difficulty with traditional supplemental and specific health insurance products is that they are structured in a way that is confusing to the typical consumer. Such insurance products are generally offered to consumers in a group setting by means of an employee setting aside time to meet with an insurance company representative at work. During this time, each of the various supplemental insurance products are presented, and the employee is generally left with a dizzying array of choices and trade-offs to consider. Since the outcome of the employee's decisions may have a significant impact on the employee and his or her family and dependents in the future, the employee will be under considerable stress in reaching the best decision. Unfortunately, the employee may be unwilling to admit to confusion engendered by the many choices due to embarrassment, and the employee may ultimately make a decision concerning insurance products that is not the optimum decision for that employee's financial condition and family circumstances.

Another important disadvantage associated with supplemental and specific health insurance policies is that their benefits structure tends to result in high premiums due to increased underwriting risk. Most types of health insurance do not provide an ultimate cap on benefits. For example, a long-term disability policy may provide payments as a fraction of an employee's income for the working life of the employee. The underwriters must assess the risk that a young employee will be disabled early in his or her working career, leading to a very high payout for the insurer. This will be reflected in the premium associated with the policy. Likewise, an accident policy may provide the same payment regardless of how many accidents a covered employee is involved in over the period of coverage. While this open-ended coverage may initially seem desirable for the insured, it may result in a premium that renders the insurance cost-prohibitive, whereas the employee might be able to afford coverage if an alternative policy with a lower premium were offered.

The art includes insurance products that have attempted to combine life and health insurance products in some manner to address some of these disadvantages. One class of such products combines term life insurance—which historically has been associated with a one-time, lump-sum cash payment—with a similar benefit paid upon the occurrence of cancer or another critical illness. For example, Columbian Life Insurance Company of Chicago, Ill. has offered a CriticaLIFE 20-year term life insurance policy that alternatively pays its one-time, lump-sum cash benefit upon the occurrence of invasive cancer, stroke, major organ transplant, blindness, heart attack, kidney failure, or paralysis. The policy premium is based upon the age of the insured and the cash benefit desired. Once the lump sum payment is made, either due to the death of the insured during the term or the prior occurrence of one of the covered illnesses, the policy is immediately terminated. As a result, the underwriting risk associated with this type of policy is capped at the policy's lump-sum benefit amount, and the result is that the insured can receive some insurance coverage upon the occurrence of a critical illness at a reduced premium compared to traditional critical illness supplemental insurance. A similar product in the whole life field has been offered by LeadersLife Insurance Company of Tulsa, Okla. under the brand Lifestyle Plan. This product combines a whole life insurance policy with supplemental coverage in the case of critical illness. Only a fraction of the death benefit is paid in the case of critical illness, however, leaving the remaining fraction to be death benefit to be paid upon the death of the insured.

Another class of products excludes life insurance but aggregates coverage for various types of critical illnesses. For example, the Synergis plan that has been offered by Kanawha Marketing Group of Lancaster, S.C., provides a one-time, lump-sum payment upon the occurrence of certain critical illnesses without a life insurance component. The coverage for particular illnesses—including heart attack, stroke, and invasive cancer—may be offered standing alone, but the insured could also combine coverage for each of these critical illnesses into one plan. Upon the occurrence of any of the covered diagnoses, the lump-sum payment is made to the insured and the policy is terminated. The term of the coverage may be the life of the insured, with premium payments made over the insured's lifetime, or alternatively higher payments may be made over a 20-year span, after which coverage is continued at no additional cost. Other variations in the art on these themes include life insurance with health insurance riders, health insurance with accident riders, and accident insurance with disability insurance riders.

As an alternative to a traditional insurance offering, employers may also offer certain types of benefits to employees through a self-funded trust administered under the federal Employment Retirement Income Security Act of 1974, as amended (ERISA). Under an ERISA plan, the funding for the plan is generally provided by the employer through a trust established for this purpose. The trust may be funded entirely by the employer, by the employees, or some combination of both. The plans are thus self-funded since the trust is intended to provide a source for all employee payments, often with a re-insurer backing the ERISA trust should the benefits payments exceed the amounts held in the trust.

References mentioned in this background section are not admitted to be prior art with respect to the present invention.

BRIEF SUMMARY OF THE INVENTION

The present invention is directed to a computerized apparatus and method by which benefits for a series of covered risks are underwritten against a single cash amount associated with a self-funded trust. As a result, the beneficiary receives a "bank" of coverage against which all claims are made. Once the bank is exhausted, the plan terminates. In various embodiments, the bank may be exhausted by a single claim, such as the death of the beneficiary, or the bank may be depleted in smaller amounts according to a schedule of benefits, such as might be the case regarding payments related to an accident. Because a single bank of coverage applies against all claims, the risk for the plan administrator is greatly reduced for this type of plan, and as a result the contributions associated with this type of plan may be significantly lower than a traditional aggregated insurance product, such as a life insurance policy with various health insurance riders. Each time a payment is made to the beneficiary, the bank is reduced and thus the potential liability of the plan administrator is reduced. This allows a low contribution to be associated with a product that provides the beneficiary with a broad range of coverage, thus extending coverage to employees and others that might otherwise be unable to afford the desired health coverage, or would otherwise be forced into selecting only certain types of coverage, and be left without any protection against other types of potentially catastrophic events.

The plan is implemented in a computer system to which plan administrators and beneficiaries may have access across a network. In certain embodiments, security methods may be employed to protect trust participants and the privacy of their information, including two-factor authentication hardware and software systems and methods.

These and other features, objects and advantages of the present invention will become better understood from a consideration of the following detailed description of the preferred embodiments and appended claims in conjunction with the drawings as described following:

BRIEF DESCRIPTION OF THE SEVERAL
VIEWS OF THE DRAWINGS

Figure 1:
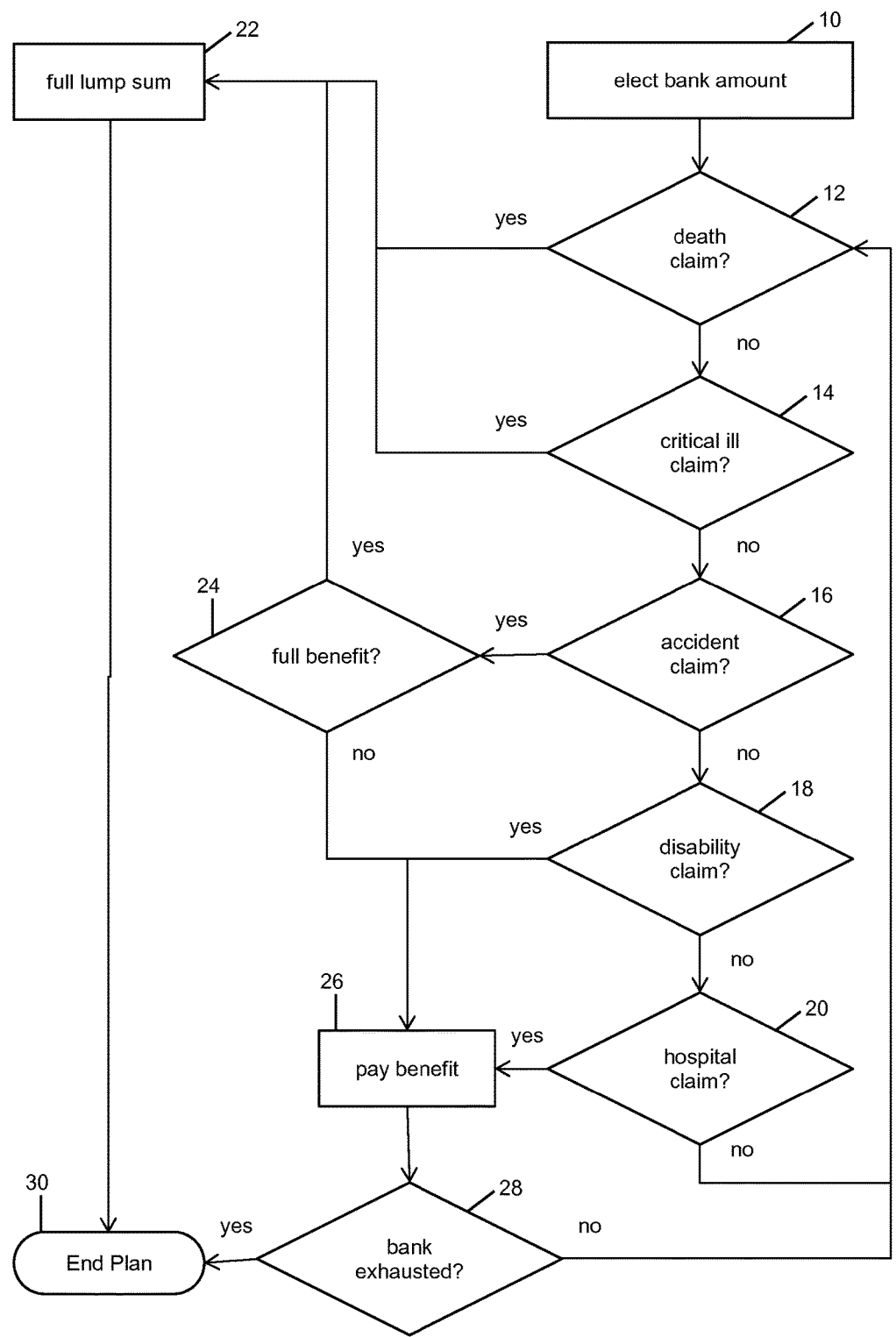
FIG. 1 is a flow chart showing processing flow according to a preferred embodiment of the present invention.
Figure 2:
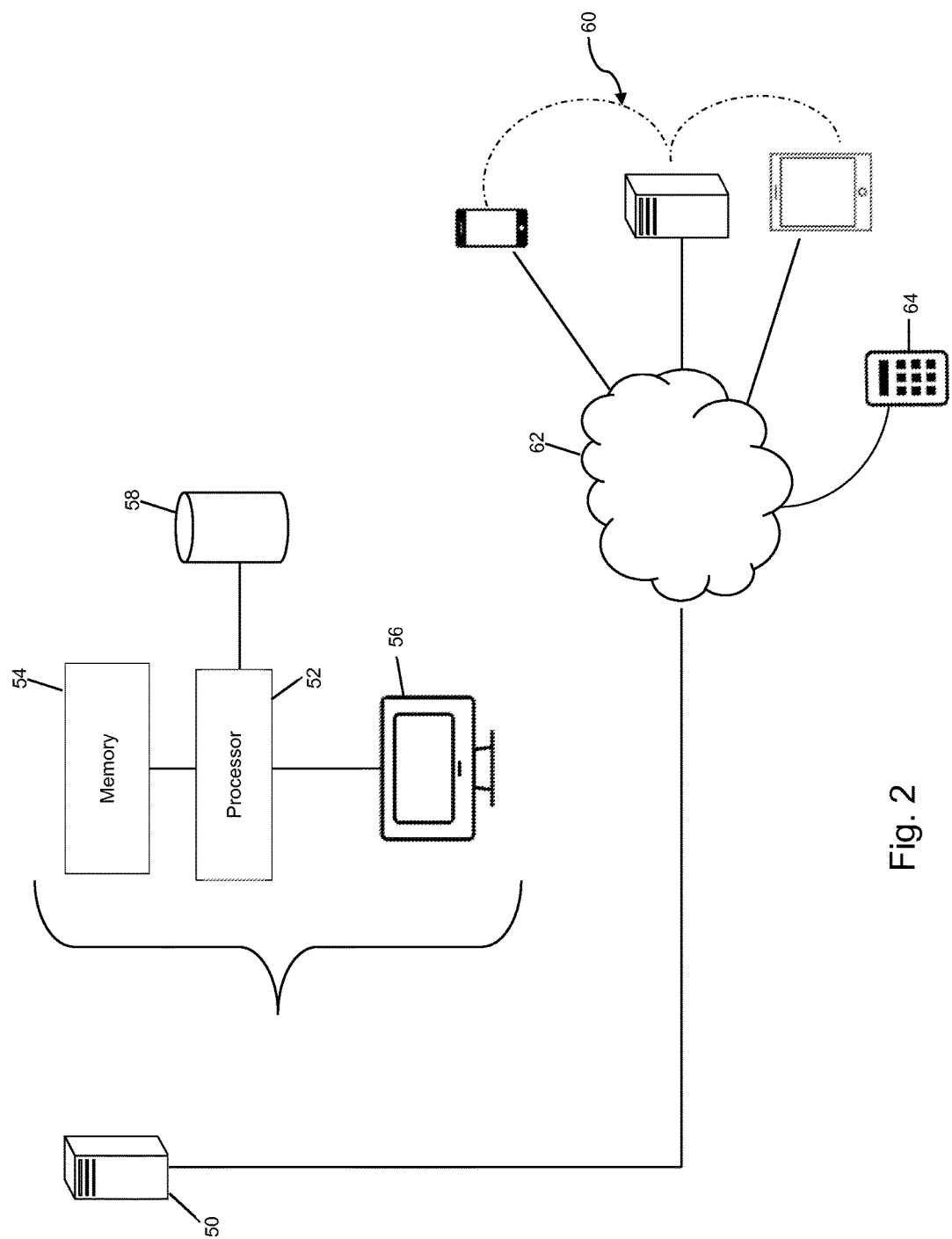
FIG. 2 is a diagram illustrating the interconnection of hardware components according to a preferred embodiment of the present invention.

DETAILED DESCRIPTION OF THE
PREFERRED EMBODIMENTS

Before the present invention is described in further detail, it should be understood that the invention is not limited to the particular embodiments described, and that the terms used in describing the particular embodiments are for the purpose of describing those particular embodiments only, and are not intended to be limiting, since the scope of the present invention will be limited only by the claims.

According to certain embodiments of the present invention, a benefit plan is presented that is associated with a "bank" of coverage. The use of the term bank is not intended to require that the amount in the bank is literally set aside in the trust on behalf of the insured, since the amount maintained in the trust may be set by applicable law or regulations; instead, this amount is tracked as the maximum benefit to be paid under the plan until the policy is terminated. Each occurrence that results in a benefit payment reduces the amount in the bank by the amount of the benefit paid, until the bank is exhausted and the plan terminates automatically. The amount of coverage provided in the bank may be set at the time that the participation in the plan is purchased in accordance with the financial means of the insured. For example, in a preferred embodiment the insured may be offered the ability to purchase coverage in increments of $5000, up to a maximum of $75,000. The contributions of the participant in the plan to cover the claim's risk is an actuarial determination as to the amount and may preferably be paid through payroll deduction into an ERISA self-funded trust plan set up by the employer. By providing a variable bank amount, some coverage may be provided even to low-income workers who are only able to afford a very low contribution to the plan, while those persons able to purchase a plan with a higher bank of coverage to provide more protection may do so.

The preferred embodiment of the present invention is an "all-risk" benefit plan that provides coverage for a wide variety of risks based on payments from the bank of coverage described above. The covered risks may preferably include life, critical illnesses/treatments, accident, hospital indemnity, and disability. The critical illnesses/treatments that are covered may preferably include cancer, heart attack, stroke, cardiac bypass, heart transplant, liver transplant, lung transplant, end-stage renal disease, amyotrophic lateral sclerosis (also known as ALS or Lou Gehrig's disease), multiple sclerosis (MS), Parkinson's disease, Alzheimer's disease, or any condition not listed above and for which a physician has determined that death will likely occur within six months.

The manner and amount of a benefit to be paid in response to each occurrence will depend upon the category in to which the occurrence falls. In a preferred embodiment, the death of the insured will result in the payment of all funds remaining in the bank of coverage provided under the plan. Similarly, the payment associated with certain critical illnesses—such as cancer, heart attack, stroke, ALS, MS, Parkinson's disease, and Alzheimer's disease—is made in the full amount of the remaining bank of coverage upon the plan participant's diagnosis. The same payment is made for certain treatments—such as cardiac bypass, covered transplants, and end-stage renal disease—upon the occurrence of the treatment. With respect to accident, supplemental hospital indemnity, and supplemental disability, the plan pays the participant according to a schedule of benefits, as are known in the art in each of these fields; payments are stopped, however, when the participant's bank is exhausted, at which point the plan automatically terminates for this participant.

Referring now to FIG. 1, an employee as participant in the plan may be presented with a proposal that includes a bank of coverage for all of the risks set forth above. In addition, the employee may be presented with a chart that indicates the actuarially determined contribution to the plan associated with each bank level, in the preferred embodiment comprising increments of $5,000 from $5,000 to $75,000. The employee that determines to participate in the plan thus determines his or her budget and, using this table, chooses the appropriate size of the bank in the insurance plan desired at step 10. It will be seen that this approach allows the employee to obtain coverage for all types of these types of risks for which insurance is generally provided, without forcing the employee to choose which risk seems more likely to occur for that particular employee or his or her family or dependents. The only decisions the employee is required to make are whether to participate in the plan, and if so what size contribution the employee can afford to pay for participation in the plan. The size of the payment will automatically determine the level of coverage, that is, the size of the bank that will be associated with the benefit purchased by the employee.

After the employee chooses the size of the bank amount at step 10, processing continues until a claim occurs. If the employee dies, then at step 12 the death benefit is found to be applicable. The full amount remaining in the employee's bank of coverage is paid to the employee's beneficiary at step 22 in a lump sum, then the policy terminates at step 30. Similarly, if the employee is diagnosed with a critical illness, then at step 14 the critical illness benefit is found to be applicable. The full amount remaining in the employee's bank of coverage is paid to the employee at step 22, and the policy terminates at step 30. If a covered accident occurs, such as dismemberment, paralysis, or other accident, then at step 16 the accident benefit is found to be applicable. The amount of the accident benefit may depend upon the type of accident that has occurred. For example, in the case of dismemberment, the loss of one member (hand, arm, foot, leg, or eye) may call for the payment of 50% of the employee's remaining bank of coverage. At step 24 then processing would move to step 26, where the appropriate benefit is paid. The loss of multiple members may call for the payment of the full remaining benefit, in which case at step 24 processing would move to step 22 to pay the full benefit remaining in a lump sum, after which the plan terminates at step 30. Similarly, in the case of paralysis, a 50% payment of the remaining bank may be made in the case of paraplegia, and thus processing moves to step 26, or the full payment of the remaining bank made in the case of quadriplegia, with processing moving to step 22 and then terminating at step 30. Other types of accidents may call for a fixed-sum monetary payment, such as $500, at step 26. Processing then moves to step 28 to determine if the employee's bank is exhausted; if so, then the policy terminates at step 30, otherwise the policy remains in place until another claim is made. In the case of a disability claim at step 18, processing moves to step 26 where the appropriate benefit is paid, such as a monthly stipend equal to 50% of the employee's normal compensation. Processing moves to step 28 to determine if the bank is exhausted after each such payment is made at step 26, and if so the policy terminates at step 30. Similarly, at step 20 if a supplemental hospital indemnity claim is made due to a hospital stay for the employee, then the appropriate benefit is paid at step 26, such as a daily benefit of $150. Again, at step 28 it is determined if the bank is exhausted, and if so processing moves to step 30 where the policy terminates; otherwise, the policy remains in force until another claim is made.

In an example based upon the processing described above with respect to FIG. 1, suppose that the employee has elected to participate in the plan with a bank amount of $75,000 at step 10. Sometime later, the employee suffers an accident at home, at step 16, for which the scheduled benefit according to the plan is $500. This amount is paid by the employer from the ERISA trust upon the occurrence of the accident at step 26. The employee's bank is thus reduced to $74,500 at this step. The bank is not exhausted at step 28, so the policy remains in place until the next claim. Sometime after this accident, the employee suffers appendicitis, and the employee is hospitalized for a short period during which an appendectomy is performed. This triggers a claim for supplemental hospital indemnity at step 20. The employee receives a plan benefit based on the length of the hospital stay at step 26, which in this case is equal to $1500. The bank associated with the employee's plan is now reduced to $73,000. Later still, the employee suffers a heart attack and is hospitalized during which time a cardiac bypass is performed. Since the full benefit is paid out in response to either the occurrence of a heart attack or cardiac bypass surgery at step 14 moving to step 22, the employee will receive a payment of $73,000, that is, the remaining bank associated with the plan. The employee's plan is then terminated at step 30, and the employee's obligation to pay into the plan likewise comes to an end.

In a variation of the above example, suppose that the employee suffers an accident for which a 50% payment of the bank amount is called for at step 26, such that the bank is reduced to $37,500. The employee has a long hospital stay, for which the daily amount would aggregate to $40,000. Since only $37,500 remains in the bank, the employee will receive this amount at step 26 rather than the $40,000 as would otherwise be received. Also, since the full amount of the bank has now been paid out, the plan is terminated at step 30 and no further contributions to the plan are made by the employee.

The processing described with reference to FIG. 1 is performed at computing device 50, which may be implemented in a number of different physical forms. For example, it may be implemented as a standard computer server as are well known in the art, or in a group of such servers. It may also be implemented as part of a rack server system. In addition, it may be implemented in a personal computer such as a desktop computer or a laptop computer. Computing device 50 includes a processor 52, memory 64, an input/output device such as a display 54, and storage medium 58. Each of the components 52, 54, 56, and 58 may be interconnected using various buses, and several of the components may be mounted on a common motherboard.

The processor 52 can execute instructions within the computing device 50, including instructions stored in the memory 54. The processor may be implemented as a chipset of chips that include separate and multiple analog and digital processors. The processor may provide, for example, for coordination of the other components of the device 50, such as control of user interfaces, applications run by device 50, and wireless communication by device 50. Memory 54 stores information within the computing device 50. The memory 54 can be implemented as one or more of a computer-readable medium or media, a volatile memory unit or units, or a non-volatile memory unit or units. Memory 54 may include, for example, flash memory and/or RAM memory.

Interaction with computing device 50 may occur through network 62, which may be a local area network (LAN) or wide area network (WAN), such as the Internet. The interaction may occur with a client device 60. A client device 60 may take the form of a personal computer, such as a laptop computer or desktop computer, as described above with respect to some implementations of computing device 50. Alternatively, client device 60 may be any other type of device that is capable of electronic communications with computing device 50, such as a smartphone, tablet, or terminal. Through client device 60, the various processing described herein with reference to FIG. 1 may be performed. This may be processing performed by an administrator with the plan that is being implemented, or an employee who is a participant in the plan, or both.

In the preferred embodiment, access to computing device 50, and the data stored therein concerning the plan and the plan's participants, is only accessible through client device 60 by means of two-factor authentication. Two-factor authentication, as well known in the art, is a method of authentication for a user that relies on the combination of two different components. In the preferred embodiment, this may be a password known to the user, in combination with an electronic key device 64. Electronic key device 64 is used to generate a dynamic passcode for a one-time use in order to access computing device 50. The user receives a one-time code, such as for example a six-digit code, and then must enter this code in order to access computing device 50. A different one-time code is generated each time access is requested. Alternatively, the one-time code may be sent to a smartphone or cellular phone rather than to a dedicated electronic key device 64.

Various implementations of the systems and techniques described here can be realized in digital electronic circuitry, integrated circuitry, specially designed ASICs (application specific integrated circuits), computer hardware, firmware, software, and/or combinations thereof. These various implementations can include implementation in one or more computer programs that are executable and/or interpretable on a programmable system including at least one programmable processor, which may be special or general purpose, coupled to receive data and instructions from, and to transmit data and instructions to, a storage system, at least one input device, and at least one output device.

These computer programs (also known as programs, software, software applications or code) include machine instructions for a programmable processor, and can be implemented in a high-level procedural and/or object-oriented programming language, and/or in assembly/machine language. As used herein, the terms "machine-readable medium" "computer-readable medium" refers to any computer program product, apparatus and/or device (e.g., magnetic discs, optical disks, memory, Programmable Logic Devices (PLDs)) used to provide machine instructions and/or data to a programmable processor, including a machine-readable medium that receives machine instructions as a machine-readable signal. The term "machine-readable signal" refers to any signal used to provide machine instructions and/or data to a programmable processor.

In addition, the logic flows depicted in the figures do not require the particular order shown, or sequential order, to achieve desirable results. In addition, other steps may be provided, or steps may be eliminated, from the described flows, and other components may be added to, or removed from, the described systems. Accordingly, other implementations are within the scope of the following claims.

Unless otherwise stated, all technical and scientific terms used herein have the same meaning as commonly understood by one of ordinary skill in the art to which this invention belongs. Although any methods and materials similar or equivalent to those described herein can also be used in the practice or testing of the present invention, a limited number of the exemplary methods and materials are described herein. It will be apparent to those skilled in the art that many more modifications are possible without departing from the inventive concepts herein.

All terms used herein should be interpreted in the broadest possible manner consistent with the context. In particular, the terms "comprises" and "comprising" should be interpreted as referring to elements, components, or steps in a non-exclusive manner, indicating that the referenced elements, components, or steps may be present, or utilized, or combined with other elements, components, or steps that are not expressly referenced. When a Markush group or other grouping is used herein, all individual members of the group and all combinations and subcombinations possible of the group are intended to be individually included. All references cited herein are hereby incorporated by reference to the extent that there is no inconsistency with the disclosure of this specification.

The present invention has been described with reference to certain preferred and alternative embodiments that are intended to be exemplary only and not limiting to the full scope of the present invention as set forth in the appended claims.

I claim:

1. A computer-implemented method for a composite risk and benefits plan associated with a trust, comprising the steps of:
    (a) providing an access portal to a plan member wherein the access portal is accessible through a web browser resident on at least one client device comprising one of a desktop computer, a laptop computer, a smartphone, a tablet, or a terminal;
    (b) receiving at the access portal, through an input/output device in communication with the at least one client device, a single bank of coverage amount, wherein the single bank of coverage amount represents a monetary maximum lifetime benefit applicable to a single life and health plan for one of a plurality of single life and health plan participants in a composite risk pool, wherein the multiple different kinds of benefits available under the single life and health plan comprise an accident benefit and one or more of a critical illness benefit, a supplemental disability benefit, a supplemental hospital indemnity benefit, and a death benefit, wherein the accident benefit comprises a first lump-sum payment corresponding to a first type of accident that is equal to 50% of the single bank of coverage amount, and a second lump-sum payment corresponding to a second more severe type of accident that is equal to the single bank of coverage amount;
    (c) transmitting the single bank of coverage amount from the client device to a processor connected to the client device over the Internet, the processor comprising a computing device comprising a server and further comprising a software program executing at the server;
    (d) storing the single bank of coverage amount in a digital storage medium in communication with the server;
    (e) receiving at the at least one client device, through the input/output device in communication with the at least one client device, a claim applicable to one of multiple different kinds of benefits available under the single life and health plan;
    (f) transmitting the claim from the at least one client device to the server over the Internet;
    (g) receiving at the server from the at least one client device over a wide area network (WAN) the claim;
    (h) using an electronic key device, generating a dynamic passcode for one-time use;
    (i) receiving at the at least one client device, through the input/output device in communication with the client device, the dynamic passcode for one-time use;
    (j) receiving at the at least one client device, through the input/output device in communication with the client device, a password known to a user of the at least one client device;
    (k) sending the dynamic passcode for one-time use and the password known to the user of the at least one client device over the Internet from the at least one client device to the server for two-factor authentication at the server;
    (l) receiving at the server the dynamic passcode for one-time use and the password known to the user of the at least one client device;
    (m) utilizing the software program to analyze the dynamic passcode for one-time use and the password known to the user of the at least one client device to authenticate the at least one client device to the server using two-factor authentication;
    (n) calculating at the software program executing at the server a benefit amount corresponding to the claim based on a type of benefit from the multiple different kinds of benefits to which the claim is applicable, wherein the multiple different kinds of benefits are stored at the digital storage medium in communication with the server;
    (o) comparing at the software program executing at the server the benefit amount to the single bank of coverage amount, reducing the single bank of coverage amount by the benefit amount wherein a minimum value of the single bank of coverage is zero, and storing the reduced single bank of coverage amount in the computer-readable medium in communication with the server;
    (p) terminating the single life and health plan when the single bank of coverage amount reaches zero;
    (q) updating at the software program executing at the server the single bank of coverage amount to a zero value and storing the zero value as the single bank of coverage amount in the computer-readable medium in communication with the server; and
    (r) generating an update message at the server, the update message accessible through the web portal using the at least one client device when the at least one client device is connected to the web portal, wherein the update message indicates that the single life and health plan has been terminated when the at least one client device is next reconnected to the web portal and the at least one client device comes online.

2. The method of claim 1, wherein the multiple different kinds of benefits available under the single life and health plan comprise a critical illness benefit, a supplemental disability benefit, an accident benefit, a supplemental hospital indemnity benefit, and a death benefit.

3. The method of claim 1, wherein the multiple different kinds of benefits available under the single life and health plan comprise a critical illness benefit that comprises a lump-sum payment equal to the single bank of coverage amount.

4. The method of claim 1, wherein the multiple different kinds of benefits available under the single life and health plan comprise a death benefit that comprises a lump-sum payment equal to the single bank of coverage amount.

5. The method of claim 1, wherein the multiple different kinds of benefits available under the single life and health plan comprise a supplemental hospital indemnity benefit comprising a daily benefit.

6. The method of claim 1, wherein the multiple different kinds of benefits available under the single life and health plan comprise a supplemental disability benefit comprising a monthly payment benefit.

7. A non-transitory computer-readable medium containing a computer program for executing a composite risk and benefit method associated with a trust, in communication with a processor comprising a computing device comprising a server to execute the computer program and the computer program comprising instructions that, when executed, cause a computer system to:
   (a) provide an access portal to a plan member wherein the access portal is accessible through a web browser resident on at least one client device comprising one of a desktop computer, a laptop computer, a smartphone, a tablet, or a terminal;
   (b) receive by means of a communication delivered over the Internet from at least one client device comprising one of a desktop computer, a laptop computer, a smartphone, a tablet, or a terminal, a single bank of coverage amount representing a monetary maximum lifetime benefit applicable to a single life and health plan for one of a plurality of plan participants in a composite risk pool, wherein the multiple different kinds of benefits available under the single life and health plan comprise an accident benefit and one or more of a critical illness benefit, a supplemental disability benefit, a supplemental hospital indemnity benefit, and a death benefit, wherein the accident benefit comprises a first lump-sum payment corresponding to a first type of accident that is equal to 50% of the single bank of coverage amount, and a second lump-sum payment corresponding to a second more severe type of accident that is equal to the single bank of coverage amount;
   (c) store the single bank of coverage amount in the non-transitory tangible computer-readable medium in communication with the server;
   (d) receive at the server a dynamic passcode for one-time use generated at an electronic key device and transmitted to the server through the at least one client device;
   (e) receive at the server a password known only to the user of the at least one client device and transmitted to the server through the at least one client device;
   (f) analyze the dynamic passcode for one-time use and the password known to the user of the at least one client device to authenticate the at least one client device to the server using two-factor authentication;
   (g) receive at the processor from the at least one client device in communication with the server over a wide area network (WAN) a claim;
   (h) calculate a benefit amount corresponding to the claim based on the type of benefit from the multiple different kinds of benefits to which the claim is applicable, wherein the multiple different kinds of benefits are stored at the non-transitory computer-readable medium in communication with the server;
   (i) compare the benefit amount to the single bank of coverage amount, reduce the single bank of coverage amount by the benefit amount wherein a minimum value of the single bank of coverage is zero, and store the reduced the single bank of coverage amount stored at the non-transitory computer-readable medium in communication with the server;
   (j) terminate the single life and health plan when the single bank of coverage amount reaches zero;
   (k) update at the software program stored on the non-transitory computer-readable medium the single bank of coverage amount to a zero value and storing the zero value as the single bank of coverage amount in the non-transitory computer-readable medium in communication with the server; and
   (l) generate an update message at the server, the update message accessible through the web portal using the at least one client device when the at least one client device is connected to the web portal, wherein the update message indicates that the single life and health plan has been terminated when the at least one client device is next reconnected to the web portal and the at least one client device comes online.

8. The non-transitory computer-readable medium containing a computer program of claim 7, wherein the multiple different kinds of benefits available under the single life and health plan comprise a critical illness benefit, a supplemental disability benefit, an accident benefit, a supplemental hospital indemnity benefit, and a death benefit.

9. The non-transitory computer-readable medium containing a computer program of claim 7, wherein the multiple different kinds of benefits available under the single life and health plan comprise a critical illness benefit that comprises a lump-sum payment equal to the single bank of coverage amount.

10. The non-transitory computer-readable medium containing a computer program of claim 7, wherein the multiple different kinds of benefits available under the single life and health plan comprise a death benefit that comprises a lump-sum payment equal to the single bank of coverage amount.

11. The non-transitory computer-readable medium containing a computer program of claim 7, wherein the multiple different kinds of benefits available under the single life and health plan comprise a supplemental hospital indemnity benefit comprising a daily benefit.

12. The non-transitory computer-readable medium containing a computer program of claim 7, wherein the multiple different kinds of benefits available under the single life and health plan comprise a supplemental disability benefit comprising a monthly payment benefit.

* * * * *